United States Patent [19]

Watanabe

[11] Patent Number: 5,061,955
[45] Date of Patent: Oct. 29, 1991

[54] MICROFILM READER/PRINTER

[75] Inventor: Izumi Watanabe, Kanagawa, Japan

[73] Assignee: Fuji Photo Film Co., Ltd., Kanagawa, Japan

[21] Appl. No.: 599,940

[22] Filed: Oct. 19, 1990

[30] Foreign Application Priority Data

Oct. 20, 1989 [JP] Japan .................................. 1-272973
Oct. 20, 1989 [JP] Japan .................................. 1-272974

[51] Int. Cl.$^5$ ............................................. G03B 13/28
[52] U.S. Cl. ....................................... 355/45; 355/64; 355/44; 355/60
[58] Field of Search ...................... 355/44, 45, 64, 23, 355/24, 25, 60, 63

[56] References Cited

U.S. PATENT DOCUMENTS

| | | | |
|---|---|---|---|
| 3,649,119 | 3/1972 | Rempala et al. ...................... | 355/45 |
| 4,737,825 | 4/1988 | Davis .................................... | 355/74 |
| 4,857,966 | 8/1989 | Ishii et al. ............................. | 355/45 |

*Primary Examiner*—Monroe H. Hayes
*Attorney, Agent, or Firm*—Sughrue, Mion, Zinn, Macpeak & Seas

[57] ABSTRACT

A microfilm reader/printer for selecting a desired image from images recorded on a microfilm roll to print the desired image, the images being recorded by the duo photographing system in two channels so that the images recorded in one channel are in the normal orientation while the images recorded in the other channel are in the inverted orientation. Desired images are printed by the microfilm reader/printer always in the normal orientation irrespective of the orientation thereof recorded in either one of the two channels on the duo mode microfilm automatically without the need of manual operation. Channel exchanging means and image rotating means are combined so that orientation of images is inverted every time the channel being retrieved is exchanged so as to display or print desired images in the same orientation. The channel exchanging means may be mechanical or optical means, and the image rotating means may be optical or electronic image processing means. The same object is achieved by the combination of channel exchange position detecting means and an image processor associated with an image sensor.

7 Claims, 5 Drawing Sheets

MICROFILM READER/PRINTER

BACKGROUND OF THE INVENTION

1. Field of the Invention

The present invention relates to a microfilm reader/printer for reading and printing an image selected from image information recorded by the duo mode in the upper and lower channels on a microfilm.

2. Prior Art

As one of the photographic techniques, the duo photograph method (reciprocal photographing method) has been adopted, in which images are recorded successively in respective frames in one channel on one-half of the film width during one passage of a microfilm roll, then the microfilm is loaded in the upside down condition to record images in the other channel on the unused half of the film width. In one conventional microfilm reader/printer for reading a microfilm on which images are recorded by the duo photographing mode (such a film will be referred to as "duo mode microfilm" in the following description), transportation of film is automatically stopped after the completion of retrieval along one channel to indicate that the operator must exchange the channel to be retrieved and turn the images to be printed to the inverted orientation. In another known microfilm reader/printer, only one channel is read so that the microfilm roll is once rewound and removed from the reader/printer and then reloaded by the operator while being turned in the inverted condition every time when retrieval through one channel is completed. Such operations are cumbersome and time-consuming.

In reading and printing images recorded on a duo mode microfilm, since the orientation of images in one channel is in the inverted relationship with the orientation of images in the other channel, the printed images are oriented randomly upside down when the read images are directly printed on a paper sheet without turning the images at every channel exchanging operations. It is a troublesome task to put the printed images in the normal orientation after the completion of printing operation. This poses a serious problem particularly when a number of images to be printed is designated by putting the corresponding codes into the memory through a keyboard and then the designated images are retrieved and printed automatically. Although it is possible to exchange the retrieved channel and to invert the orientation of the image by a manual operation, or to remove the microfilm roll from the reader/printer and then reload it in the upside-down condition by hand, such a manual operation is cumbersome and inefficient and cannot be adopted in an automated system in which a number of image codes is stored in a memory so that corresponding images are successively printed.

OBJECT AND SUMMARY OF THE INVENTION

An object of this invention is to provide a microfilm reader/printer for selecting a desired image from images recorded on a microfilm roll to print the desired image automatically in a normal orientation without the need for manual operation of inverting the image or reloading the microfilm roll, when the images are recorded by the duo photographing mode in two channels with the images recorded in one channel being in the normal orientation while the images recorded in the other channel being in the inverted orientation.

A specific object of this invention is to provide such a microfilm reader/printer by which a number of desired images to be printed can be designated by putting and memorizing corresponding codes in a memory, whereby the desired images are successively printed in normal orientation without the need of rearranging paper sheets bearing the printed images in order.

According to a first aspect of this invention, the object of this invention is achieved by the provision of a microfilm reader/printer for selecting a desired image from images recorded on a microfilm roll to print said desired image, said images being recorded by the duo photographing system in two channels so that the images recorded in one channel are in the normal orientation while the images recorded in the other channel are in the inverted orientation, comprising:

(a) film transporting means for transporting said microfilm roll alternately in one and the reverse directions;

(b) channel exchanging means for exchanging the channel so that images in said one channel are retrieved while said microfilm roll is transported in said one direction and images in said other channel are retrieved while said microfilm roll is transported in said reverse direction;

(c) an optical system for projecting said desired image selected from the searched channel;

(d) image rotating means disposed in or downstream of said optical system for inverting said desired image when it is recorded in said other channel in the inverted orientation; and (e) printing means for printing said desired image in the not-inverted or inverted condition; whereby said desired image is printed in the normal orientation irrespective of whether it is recorded in said one channel or said other channel.

The desired image projected through an optical system is inverted by optical means to be printed in normal orientation when inversion of the image is necessary. One example of the preferable optical means for inverting the desired image is an image rotating prism which is interposed along the optical axis of the optical system.

The channel exchanging means may be a mechanism by which the microfilm roll is moved along its width direction, for example, by shifting a support plate supporting the microfilm roll, or may be a prism or other optical means by which the optical axis of the optical system is shifted along the width direction of the microfilm roll.

According to a second aspect of this invention, there is provided a microfilm reader/printer for selecting a desired image from images recorded on a microfilm roll to print said desired image, said images being recorded by the duo photographing system in two channels so that the images recorded in one channel are in the normal orientation while the images recorded in the other channel are in the inverted orientation, comprising:

(a) film transporting means for transporting said microfilm roll alternately in one and the reverse directions;

(b) channel exchanging means for exchanging the channel so that images in said one channel are retrieved while said microfilm roll is transported in said one direction and images in said other channel are retrieved while said microfilm roll is transported in said reverse direction;

(c) an optical system for projecting said desired image selected from the retrieved channel;

(d) an image sensor for sensing said desired image from the retrieved channel to output an image signal;

(e) an image processor for digitizing said image signal output from said image sensor to feed the digitized image signal in the same order as received when said desired image is recorded in said one channel and to feed the digitized image signal in the reverse order when said desired image is recorded in said other channel; and (f) printing means for printing said desired image in the not-inverted or inverted condition; whereby said desired image is printed in the normal orientation irrespective of whether it is recorded in said one channel or said other channel.

According to the second aspect of the invention, the desired image is inverted to be in normal orientation by electronic image processing means, when inversion thereof is necessary.

Irrespective of whether the image is inverted by optical means or electronic image processing means, the microfilm reader/printer of this invention may be provided with channel exchange position detecting means. The channel exchange position detecting means detects the position or timing, at which the channel under retrieval is to be exchanged, to generate an output signal. In response to the output signal from the channel exchange position detecting means, the channel under retrieval is exchanged by the channel exchange means. By the provision of the channel exchange position detecting means, adaptability of the microfilm reader/printer for automatic retrieving (or searching) and printing may be enhanced. The channel exchange position detecting means may comprise a photo-sensor for detecting and discriminating whether the desired image in the retrieved channel is in the normal orientation or in the inverted orientation. Alternatively, the channel exchange position detecting means may comprise an arithmetic unit for discriminating the end of one channel by computing the transported length of the microfilm roll. In a further modified embodiment, the channel exchange position detecting means may comprise a keyboard through which a channel exchange signal is fed to the channel exchange means.

According to a third aspect of this invention, there is provided a microfilm reader/printer for selecting a desired image from images recorded on a microfilm roll to print said desired image, said images being recorded by the duo photographing system in two channels so that the images recorded in one channel are in the normal orientation while the images recorded in the other channel are in the inverted orientation, comprising:

(a) film transporting means for transporting said microfilm roll in one direction;

(b) channel exchange position detecting means for detecting the position at which the channel to be retrieved is exchanged to output an output signal;

(c) an optical system for projecting two images including one image in said one channel and another image in said other channel simultaneously;

(d) an image sensor for sensing said two images including said one image recorded in said one channel and said other image recorded in said other channel to output an image signal;

(e) an image processor for digitizing said image signal output from said image sensor and for extracting a part of said image signal corresponding to said desired image in response to the output signal from said channel exchange position detecting means to feed the digitized image signal in the same order as received when said desired image is recorded in said one channel and to feed the digitized image signal in the reverse order when said desired image is recorded in said other channel; and (f) printing means for printing said desired image in the not-inverted or inverted condition in response to the digitized image signal fed thereto; whereby said desired image is printed in the normal orientation irrespective of whether it is recorded in said one channel or said other channel.

According to the third aspect of the invention, two images including one image recorded in one channel in the normal orientation and another image recorded in the other channel in the inverted orientation are sensed by one image sensor simultaneously, and a part of the image signal output from the image sensor and corresponding to the desired image is selectively extracted to be printed in the not-inverted condition when the desired image is recorded in the normal orientation or to be printed in the inverted condition when the desired image is recorded in the inverted orientation. Inversion of the desired image is effected electronically by feeding the selected part of the image signal in the reverse order to the printing means, when the desired image is recorded in the inverted orientation. Accordingly, the channel exchanging means need not be provided although the channel exchange position detecting means is indispensable.

DESCRIPTION OF PREFERRED EMBODIMENTS

The present invention will now be described in detail by referring to presently preferred embodiments thereof schematically illustrated in the appended drawings.

Figure 3:
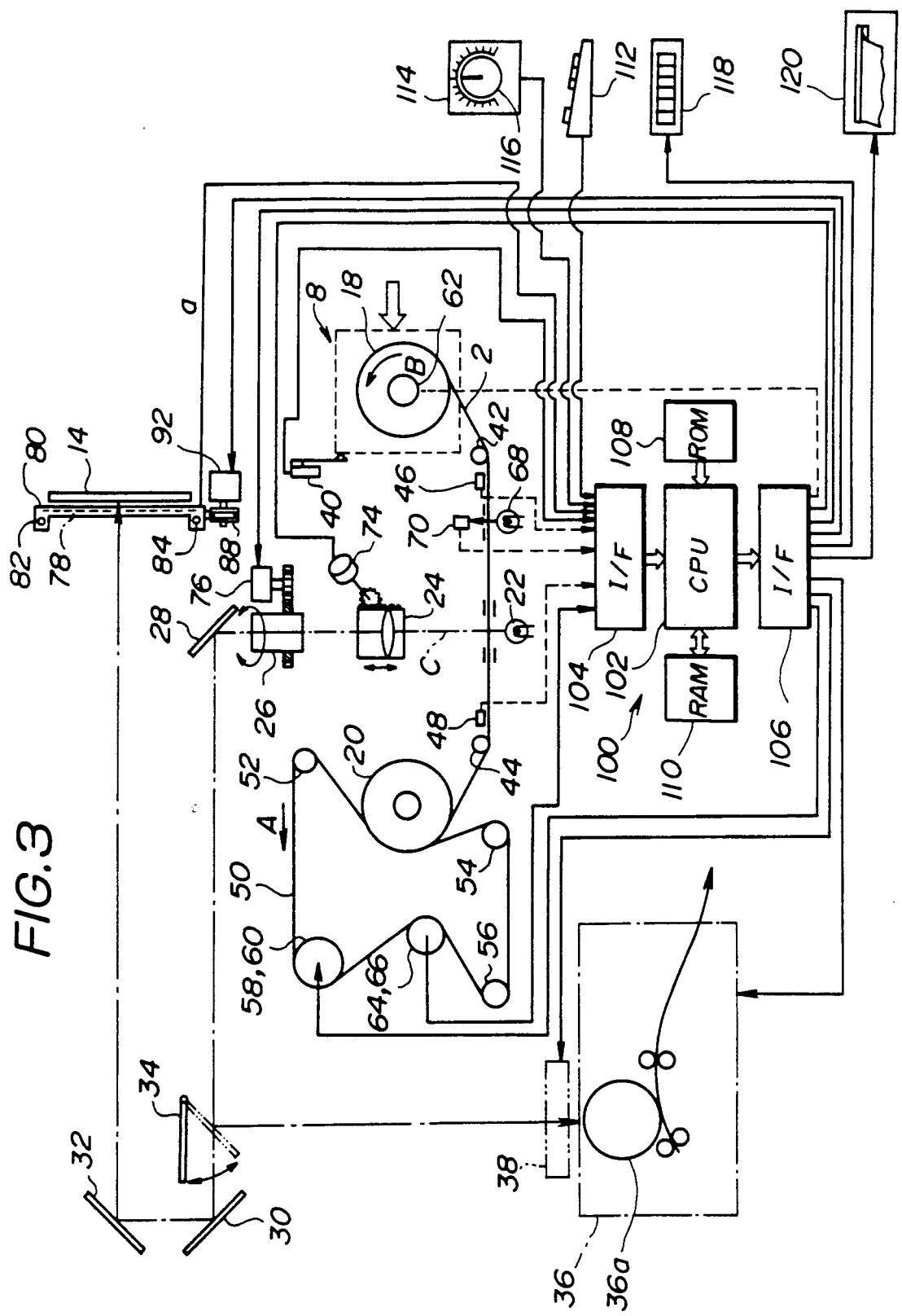
FIG. 3 is a circuit diagram showing the control system associated with the embodiment shown in FIG. 1.
Figure 4:
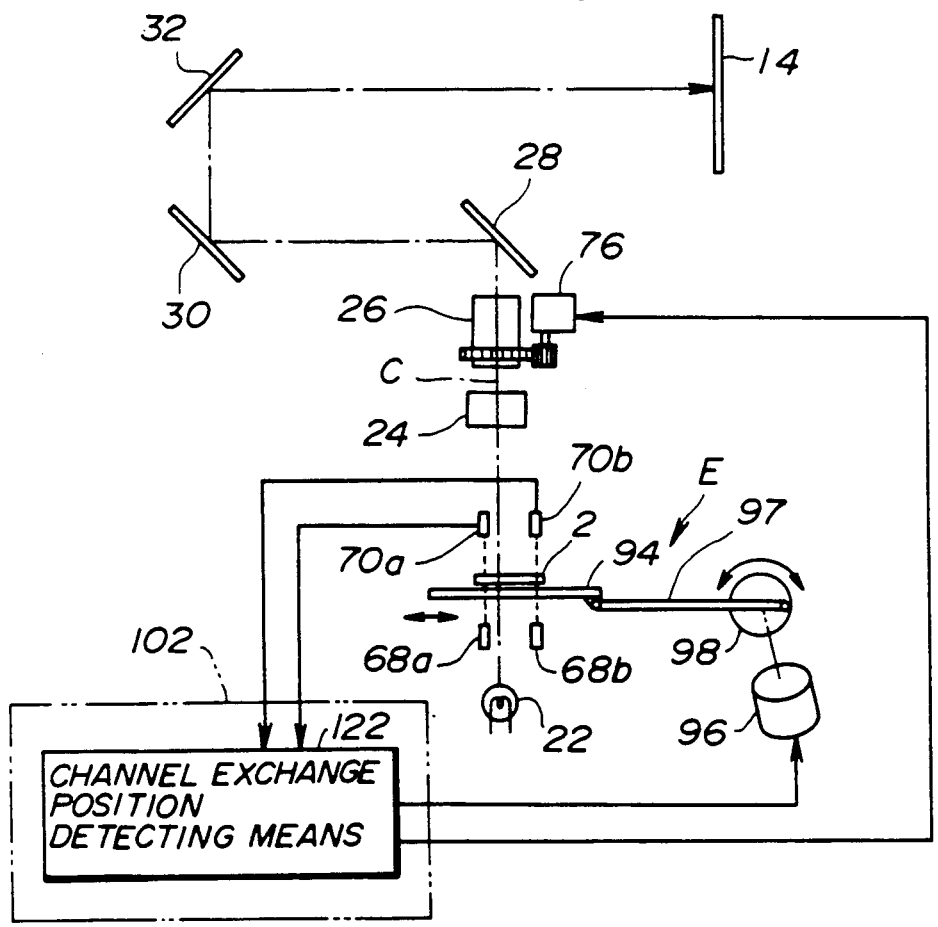
FIG. 4 is a schematic illustration showing an embodiment of the channel exchange means, in which only the important parts of the channel exchange means are diagrammatically shown for simplicity of illustration.
Figure 5:
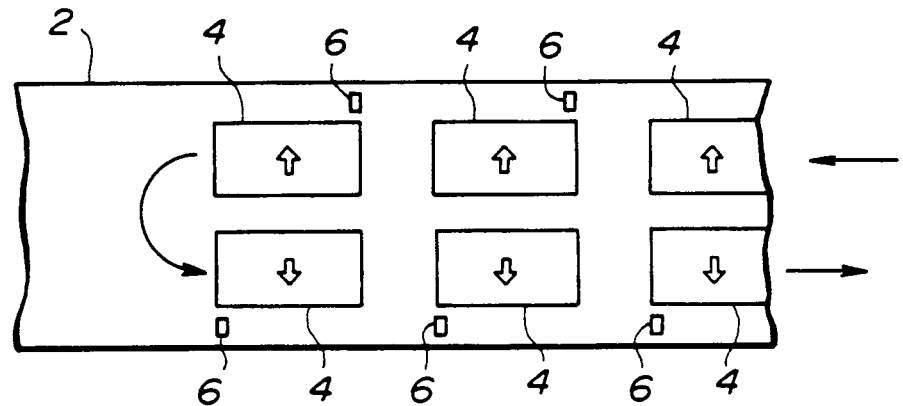
FIG. 5 is a plan view showing a part of a microfilm roll on which images are recorded in the duo mode system.

Initially referring to FIGS. 1 to 5, images are recorded on a microfilm roll 2 shown in FIG. 5 in the duo mode. The microfilm roll 2 has an upper channel along which images are recorded in plural frames 4. The images recorded in the frames 4 of the upper channel are photographed in the order reading from the right to the left. The microfilm roll 2 also has a lower channel along which images are recorded in plural frames 4. The images recorded in the frames 4 of the lower channel are photographed in the order reading from the left to the right. The orientation of the images in the lower channel is in the inverted relationship with the orientation of the images in the upper channel. Each frame 4 is attached with one document mark or blip mark 6 which is recorded in the marginal zone of the microfilm roll 2. These blip marks 6 are used during the retrieving operation to identify individual images. For instance, the positions and lengths of respective blip marks are differentiated to have plural coding informations, such as File No., Block No. and Page No. The microfilm roll 2 is contained in a cartridge (see FIGS. 1 to 3) which is loaded in a microfilm reader/printer 10.

Figure 1:
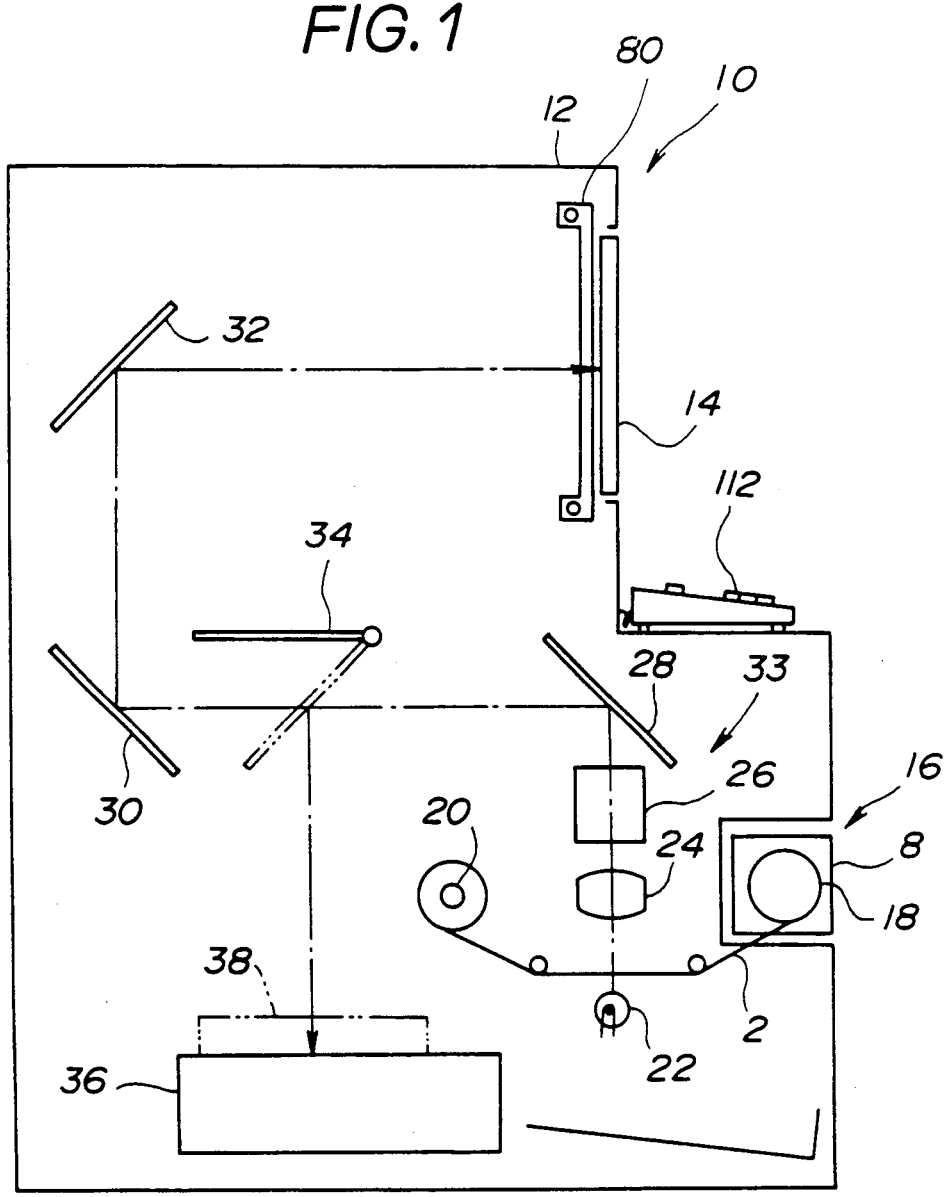
FIG. 1 is a schematic illustration showing the general arrangement of a first embodiment of the invention.

The general arrangement of the reader/printer 10 is shown in FIG. 1. As shown, the reader/printer comprises a casing 12 having a front face (the upper right face as shown in FIG. 1) on which a light transmitting screen 14 is arranged. An image in each frame 4 on the microfilm roll 2 contained in the cartridge 8 is projected on the screen 14 in an enlarged size. The cartridge 8 is loaded in a cartridge receiving port 16 positioned below the screen 14. The leading end of the microfilm roll 2 wound around a supply reel 18 in the cartridge 8 is drawn out of the cartridge 8 by a loading mechanism to be taken up around a take-up reel 20. A light source 22 is arranged below the microfilm 2 extending between the reels 18 and 20. The light emitted from the light source 22 passes through the microfilm 2 and an optical system 33 to the screen 14, the optical system 33 including a projection lens 24, an image rotating prism 26 (serving as image rotating means) and plural reflection mirrors 28, 30 and 32. As a result, an image recorded on one frame 4 on the microfilm roll 2 is enlarged and projected on the screen 14.

A retractable mirror 34 is disposed to be moved to a position intermediate of the optical axis from the reflection mirror 28 to the reflection mirror 30 so that the light projecting the image is led to a printing means or printing unit 36. In the illustrated embodiment, the printing unit 36 is a PPC system unit having a photosensitive drum 36a (see FIG. 3) on which a latent electrostatic image is formed upon exposure to light, the latent electrostatic image being visualized by applying a toner to be transferred on a paper sheet. The transferred toner image is then fixed by any proper means. The printing unit 36 has a mask 38 which shields the area otherwise forming black marginal frames when the images recorded in the microfilm roll 2 are negative images.

Figure 2:
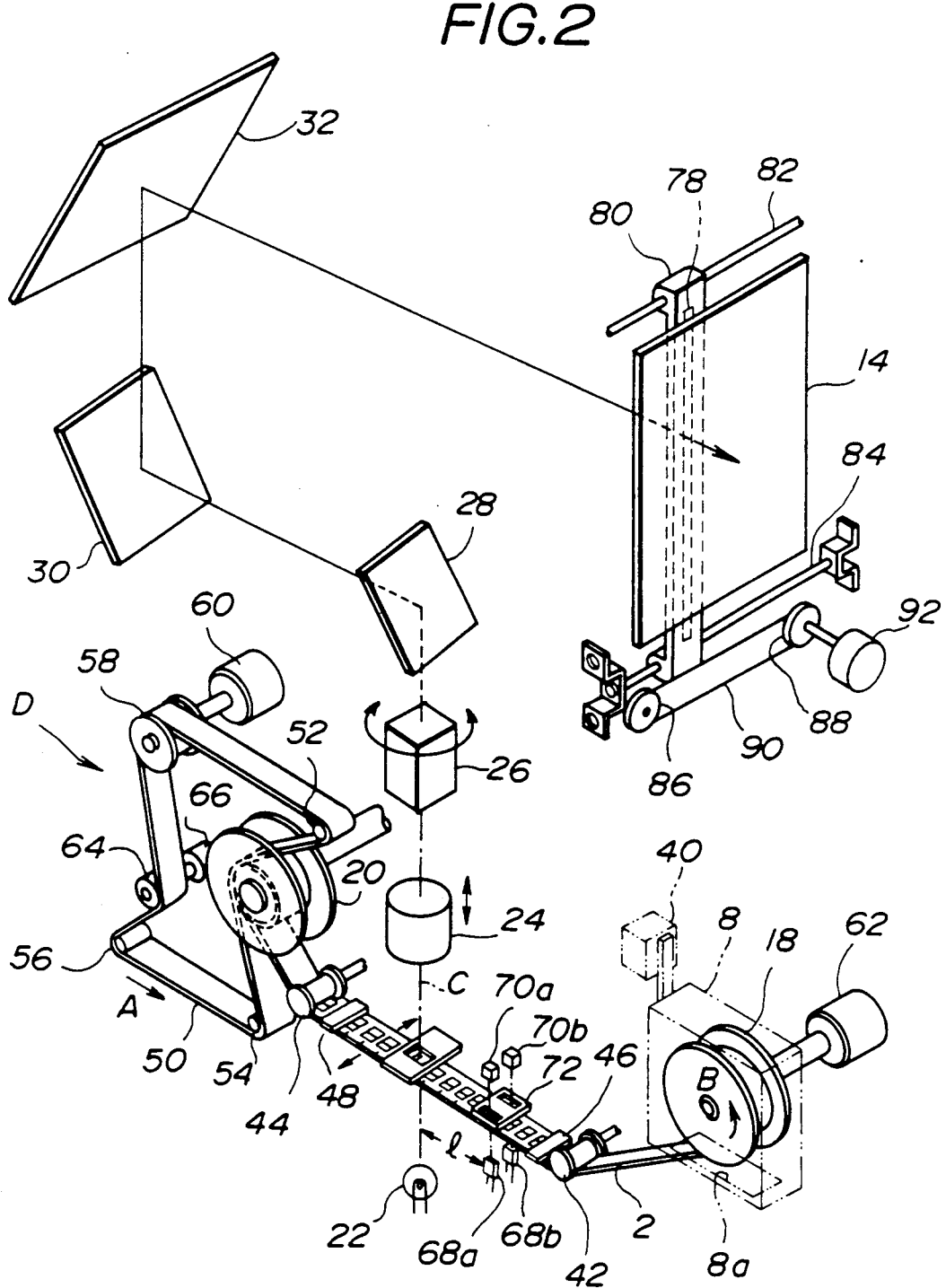
FIG. 2 is a schematic illustration showing, in an exploded view, the important parts of the embodiment shown in FIG. 1.

The film transporting means or mechanism D is shown in FIG. 2. The film transporting mechanism D is shiftable along the width direction of the microfilm 2 in response to the instruction from channel exchanging means E which will be described in detail hereinafter, whereby either one of the upper or lower channel is selectively retrieved and read out. When the cartridge 8 is loaded in the cartridge receiving port 16, a micro switch 40 detects the loading of the cartridge 8 so that the loading mechanism is actuated in response to the instruction from a CPU 102 which will be described in detail hereinafter. The leading end of the microfilm roll 2 is drawn through an opening 8a formed through the bottom wall of the cartridge 8 while rotating the reel 18 following to the rotation of a roller (not shown). The thus drawn leading end of the microfilm roll 2 passes through guide rollers 42 and 44 to be taken up around the take-up reel 20. Sensors 46 and 48 for sensing the presence or absence of the microfilm roll 2 are disposed in the vicinity of the guide rollers 42 and 44. An endless belt 50 is pressed onto the take-up reel 20 so that the microfilm roll 2 is tightly engaged by the belt 50. The endless belt 50 runs over guide rollers 52, 54, 56 and a drive roller 58. The drive roller 58 is driven by a motor 60 to run in the direction shown by the arrow A in FIG. 2 when the microfilm roll 2 is taken up by the reel 20. As a result, the microfilm roll 2 is taken up around the reel 2 while being tightly grasped between the belt 50 and the reel 20. When the cartridge 8 is loaded, the supply reel 18 is connected to an output shaft of a motor 62. When it is desired to rewind the microfilm roll 2, the motor 62 is actuated to rotate the reel 18 in the direction shown by the arrow B in FIGS. 2 and 3. During this rewinding operation, the belt 50 runs following to the microfilm roll 2.

A tension roller 64 engages with the endless belt 50 so that the belt 50 runs under an appropriate tension. The revolution rate of the tension roller 64 is detected by an encoder 66 which generates output pulse signals. The output pulse signals from the encoder 66 are fed to the CPU 102 so that the running rate of the endless belt 50 is computed to find the length of the microfilm roll 2 fed to the take-up reel 20.

The blip marks 6 recorded on the marginal zones of the microfilm roll 2 are sensed by two photo-sensor pairs which are disposed at the positions closer to the supply reel 18 by a constant distance l than the center optical axis of the light from the light source 22, each of the photo-sensor pairs employed in the illustrated embodiment comprise a light emitting element 68 (68a, 68b) and a light receiving element 70 (70a, 70b). These photo-sensor pairs are shifted in position by the channel exchanging means E in synchronism with the shifting of the film transporting mechanism D. The lights emitting from the light emitting elements 68 are shielded by a plate having slits 72 so that only the portions of the lights passing through the slits 72 are selectively received by the light receiving elements 70, the slits 72 being faced to the zones in which the blip marks 6 are recorded. The outputs from the light receiving elements 70 are fed into the CPU 102, so that individual frames 4 passing below the light receiving elements 70 are identified by sensing the kinds of individual blip marks and integrating the number of blip marks already passing below the light receiving elements 70. Since the blip marks 6 just sensed by the photo-sensors are spaced from the center light axis C by a constant distance l, the frame 4 just projected by the light source 22 can be identified by monitoring the channel under retrieval by the channel exchange means E and by monitoring the feed length of the microfilm roll 2 by the encoder 66. When a blip mark 6 attached to a frame in which a desired image is recorded is sensed, the microfilm roll 2 is passed by a distance l toward the take-up reel 20 or the supply reel 18 to move the frame to the position at which the desired image is projected by the light from the light source 22.

As the frame 4, in which the desired image is recorded, is irradiated by the light having the center optical axis of C, the image information of the desired image is projected on the screen 14. The magnification degree of the projection lens 24 may be varied by rotating a motor 74, and the degree of rotation of the image effected by rotating the image rotating prism 26 may be varied by controlling a motor 76 (see FIG. 3).

A CCD line sensor 78 which serves as the image sensor is held behind the screen 14 by a movable plate 80 which is moved in the horizontal direction while being guided by guide rails 82 and 84. As shown in FIG. 2, ends of a wire 90 extending around a pair of pulley wheels 86 and 88 are fixedly connected to the right and left edges of the lower end of the movable plate 80. The pulley wheel 88 is rotated by a motor 92 to drive the wire 90 so that the movable plate 80 is moved in the horizontal direction.

The channel exchanging means E will now be described with reference to FIG. 4. In the illustrated embodiment, the film transporting mechanism D and the light emitting elements 68 and the light receiving elements 70 for sensing the blip marks 6 are supported on a common support plate 94 which is connected through a link 97 to an eccentric angular position on a circular disk 98 which is rotated by a motor 96. As the circular disk 98 is rotated by 180 degrees from the position shown in FIG. 4 by actuating the motor 96, the common support plate 94 is shifted by a half width of the microfilm roll 2. The channel selectively irradiated by the light from the light source 22 is thus exchanged so that the channel to be searched is exchanged from the upper channel to the lower channel, or vise versa. The channel exchanging means assembled in the illustrated embodiment comprises a common support plate 94 on which the microfilm roll 2 is placed, and film shifting means for moving the microfilm roll 2 in the width direction, the film shifting means including the motor 96, the circular disk 98 and the link 97.

A controller 100 will be described with reference to FIG. 3. The controller 100 comprises a digital computing unit (hereinafter referred to as "CPU") 102, input and output interfaces (I/F) 104, 106, a ROM 108 for storing an operation program and other data, and a RAM 110 for storing the image signals sensed by the line sensor 78 and other various data. The CPU 102 receives various signals through the input I/F. For example, it receives the image signals a sensed by the line sensor 78, and output signals from the micro switch 40, sensors 46, 48, the light receiving elements 70 and the encoder 66. A code for identifying one desired image or codes for identifying multiple desired images to be printed may be put through a keyboard 112 into the CPU 102.

Reference numeral 114 designates a manually operated feed setting dial 114 through which the feed direction and the feed rate of the microfilm roll 2 are put into the CPU 102. The operation knob 116 of the feed setting dial has an intention to return to the neutral position, and as the knob 116 is turned to the left or right by a certain angle the revolution rate corresponding to the turned angle is put into the CPU 102. The CPU 102 controls the transport direction and transportation rate of the microfilm roll 2 in response to the direction and angular dislocation of the knob 116 from the neutral position. In detail, the microfilm roll 2 is stopped when the knob 116 is set to the neutral position, the microfilm roll 2 is transported in the left direction as viewed in FIG. 3 when the knob 116 is turned to the left, and the microfilm roll 2 is transported in the right direction as viewed in FIG. 3 when the knob 116 is turned to the right.

Reference numeral 118 designates an odometer for indicating the transported length of the microfilm roll 2 measured from the leading end of the microfilm roll 2. The running length of the endless belt 50 which runs in synchronism with the microfilm roll 2 can be computed by adding or subtracting the output pulse signals from the encoder 66, and the result of computation is displayed on the odometer 118.

Reference numeral 120 designates a digital mode printer which is used to print multiple images sensed by the line sensor 78 successively through automated operations, the codes corresponding to the multiple images to be printed being memorized previously in the illustrated embodiment. The CPU 102 may be connected to an additional reader/printer so that images fed from the additional reader/printer are printed by the printer 120.

The CPU 102 also controls the operation of channel exchange position detecting means 122 as shown in FIG. 4. The channel exchange position detecting means 122 receives the output signals from the light receiving elements 70 to discriminate individual blip marks 6 to judge that retrieval of a certain channel is stopped as it receives a specified blip mark having a certain discriminating wave form. Otherwise, completion of retrieval of a certain channel may be judged as the length of the transported film, which is calculated by counting the output signals from the encoder 66, reaches a predetermined length.

As the channel exchange position detecting means 122 judges that retrieval of a certain channel should be stopped, a signal is fed from the CPU 102 to the motors 96 and 76. Upon receipt of the signal from the CPU 102, the channel exchanging means E exchange the channel or the image rotating prism 26 is rotated to invert the orientation of the projected image. As a result, the channel exchange operation can be effected automatically so that an image of normal orientation is displayed on the screen 14.

Although the blip marks 6 are sensed to feed signals for instructing exchange of the channel to be searched into the CPU 102 in the illustrated embodiment, an instruction for exchanging the channel may be put through the keyboard 112 to the CPU 102 as desired.

Since the printer unit 36 is assembled in the illustrated embodiment, all of the printed images are put in order to be oriented in the same orientation irrespective of either one of the channels, in which images are recorded in the inverted relationship with each other, are retrieved and printed. Accordingly, cumbersome operation of inverting the sheets on which images are printed in false orientation is not required.

As will be appreciated from the foregoing, by using the embodiment of the invention described above, orientation of images can be inverted at every time when the channel to be retrieved is exchanged to display desired images always in normal orientation and to print the desired images in the same orientation. Neither a manual operation for exchanging the channel or rotating the image nor reloading of the microfilm roll in the inverted condition after rewinding of the microfilm is necessary. Accordingly, the image searching operation can be simplified to improve the operation efficiency.

Figure 6:
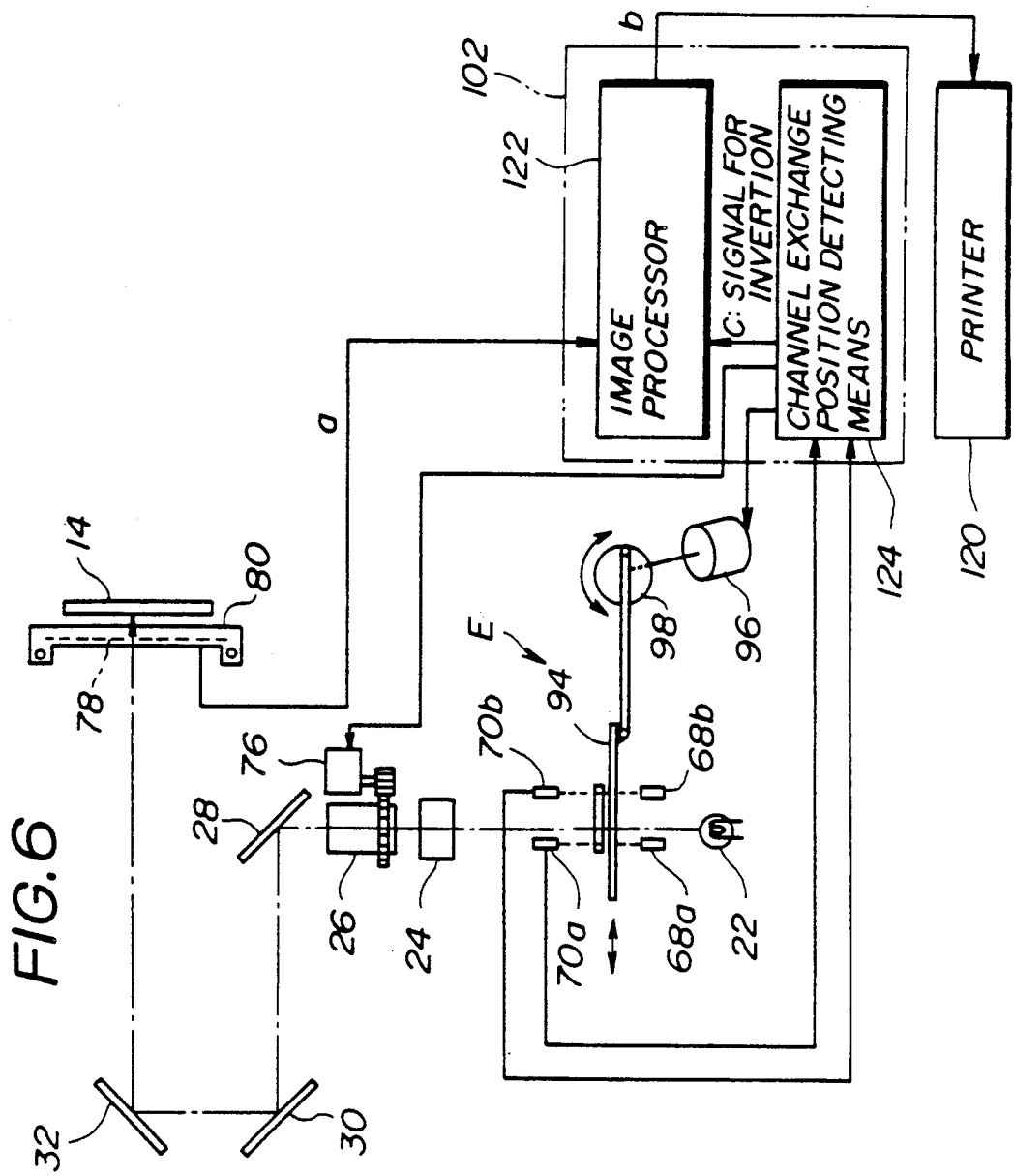
FIG. 6 is a schematic illustration showing the general arrangement of a second embodiment of the invention.

A second embodiment of the invention is shown schematically in FIG. 6. The general construction of the second embodiment excluding the parts shown in FIG. 6 is similar to that of the first embodiment, and the description thereof will not be given for the simplicity of explanation.

The CPU 102 used in the second embodiment serves as an image processor for processing the image informations sensed by the image sensor 78 in addition to various services or functions, for example, for detecting the channel exchange position as in the first embodiment. In detail, in the second embodiment, the CPU 102 serves both as an image processor 124 and as channel exchange position detecting means 122. The image processor 124 receives an image signal a from the line sensor 78 to digitize and memorize the signal in a frame memory in the RAM 110 or in another independent frame memory to output a digitized image signal b which is fed to the printer 120. The channel exchange position detecting means 122 receives the outputs from the light receiving elements 70 to discriminate individual blip marks 6 to judge when retrieval of a certain channel should be stopped from the wave form of a certain blip mark 6 to exchange the channel to be retrieved. Otherwise, completion of retrieval of a certain channel may be judged as the length of the fed film, which is calculated by counting the output pulse signals from the encoder 66, reaches a predetermined length.

As the channel exchange position detecting means 122 judges that retrieval of a certain channel should be stopped, a signal is fed from the CPU 102 to the motors 96 and 76 and simultaneously another signal is fed from the CPU 102 to the image processor 124. Upon receipt of the signal from the CPU 102, the channel exchanging means E exchange the channel. Upon receipt of a signal c (signal for inverting the orientation of images) from the channel exchange position detecting means 122, the image processor 124 outputs the digitized signal b in the reverse order to the printer 120, whereby the orientation of the printed image is inverted. As a result, the images printed by the printer 120 are in the same orientation notwithstanding the retrieved channel is exchanged.

In the second embodiment, the digitized image signal b is fed to the printer 120 in the reverse order as a certain position in one channel is detected. Accordingly, when the second embodiment is used only for printing selected images, the image rotating means (image rotating prism 26) used in the first embodiment may be eliminated.

However, when the second embodiment is used also as a microfilm reader for visually inspecting images displayed on the screen 14, an image rotating prism 26 is assembled and rotated in response to the output from the channel exchange position detecting means to invert the projected images if necessary, whereby images of normal orientation are always displayed on the screen 14. In the case where the second embodiment provided with the image rotating prism 26 is used as a microfilm reader, the image processor 124 outputs the digitized image signal b in the same order as received notwithstanding the presence of the signal c for inverting the orientation of images.

Although the second embodiment has been described as it is used for sensing only one desired image by the image sensor 78, two images including one image in one channel and another image in the other channel may be simultaneously sensed by the image sensor 78, followed by digitization of the image signal from the image sensor 78 to obtain a digitized image signal b, and then a part of the digitized image signal b is extracted to be printed by the printer 120. In such a case, the image processor 124 selectively extracts the part of the digitized signal b corresponding to the desired image to feed the thus extracted part of the digitized signal b to the printer 120. When the signal c for inverting the orientation of the desired image is fed from the channel exchange position detecting means 122, the part of the digitized signal b corresponding to the desired image is extracted and then fed in the reverse order to the printer 120. Accordingly, it is not essential to provide the channel exchange means E in the second embodiment.

Although the second embodiment has been described as it is provided with the printing unit 36 in addition to the printing unit 120, the object of this invention is achieved by the provision of the printing unit 120. The image processor 124 may comprise an independent digital processing unit other than using the CPU 102.

Although a linear image sensor 78 is arranged behind the screen 14 so that scanning of each frame is effected by mechanically moving the linear image sensor 78 in the horizontal direction in the aforementioned embodiments, the image sensor 78 may be disposed at a position just above the microfilm frame irradiated from the light from the light source 22. Alternatively, a two-dimensional image sensor may be used in place of the linear image sensor 78 to eliminate the need of mechanical scanning operation.

To summarize, according to the second embodiment of the present invention, images recorded in two channels on a duo mode microfilm are sensed while detecting the channel exchange position so that the sensed images are printed by means of an image processor in the inverted orientation at every time when channel exchange positions are detected, whereby the printed images are always in the normal orientation without the need of manual operation for exchanging the channel or for rotating the projected images.

In addition, plural desired images can be read out successively to get printed images thereof on paper or like sheets to be in the same orientation without the need of reloading the microfilm roll while turning or reversing each cartridge for containing the microfilm roll. Thus, the embodiment of the invention is particularly convenient when corresponding codes of multiple images have been previously stored in a memory and some desired images are retrieved and printed at desired time automatically.

What is claimed is:

1. An microfilm reader/printer for selecting a desired image from images recorded on a microfilm roll to print said desired image, said images being recorded by the duo photographing system in two channels so that the images recorded in one channel are in the normal orientation while the images recorded in the other channel are in the inverted orientation, comprising:

(a) film transporting means for transporting said microfilm roll alternately in one and the reverse directions;

(b) channel exchanging means for exchanging the channel so that images in said one channel are retrieved while said microfilm roll is fed in said one direction and images in said other channel are retrieved while said microfilm roll is fed in said reverse direction;

(c) an optical system for projecting said desired image selected from the retrieved channel;

(d) an image sensor for sensing said desired image from the retrieved channel to output an image signal;

(e) an image processor for digitizing said image signal output from said image sensor to feed the digitized image signal in the same order as received when said desired image is recorded in said one channel and to feed the digitized image signal in the reverse order when said desired image is recorded in said other channel; and (f) printing means for printing said desired image in the not-inverted or inverted condition; whereby said desired image is printed in the normal orientation irrespective of whether it is recorded in said one channel or said other channel.

2. The microfilm reader/printer according to claim 1, further comprising channel exchange position detecting means for detecting the position at which the retrieved channel is to be exchanged to output an output signal, said channel exchanging means receiving said output signal from said channel exchange position detecting means to exchange the retrieved channel, and said image processor feeding said image signal in the reverse order in response to the output signal fed from said channel exchange position detecting means when said desired image is recorded in said other channel.

3. The microfilm reader/printer according to claim 2, wherein said channel exchange position detecting means comprises a photo-sensor for detecting and discriminating whether the retrieved channel is said one channel or said other channel.

4. The microfilm reader/printer according to claim 2, wherein said channel exchange position detecting means comprises an arithmetic unit for discriminating the end of said one channel by computing the transported length of said microfilm roll.

5. A microfilm reader/printer for selecting a desired image from images recorded on a microfilm roll to print said desired image, said images being recorded by the duo photographing system in two channels so that the images recorded in one channel are in the normal orientation while the images recorded in the other channel are in the inverted orientation, comprising:

(a) film transporting means for transporting said microfilm roll one direction;

(b) channel exchange position detecting means for detecting the position at which the channel to be retrieved is exchanged to output an output signal;

(c) an optical system for projecting two images including one image in said one channel and another image in said other channel simultaneously;

(d) an image sensor for sensing said two images including one image recorded in said one channel and another image recorded in said other channel simultaneously;

(e) an image processor for digitizing said image signal output from said image sensor and for extracting a part of said image signal corresponding to said desired image to feed the digitized image signal in the same order as received when said desired image is recorded in said one channel and to feed the digitized image signal in the reverse order when said desired image is recorded in said other channel; and (f) printing means for printing said desired image in the not-inverted or inverted condition; whereby said desired image is printed in the normal orientation irrespective of whether it is recorded in said one channel or said other channel.

6. The microfilm reader/printer according to claim 5, wherein said channel exchange position detecting means comprises a photo-sensor for detecting and discriminating whether the retrieved channel is said one channel or said other channel.

7. The microfilm reader/printer according to claim 5, wherein said channel exchange position detecting means comprises an arithmetic unit for discriminating the end of said one channel by computing the transported length of said microfilm roll.

* * * * *